United States Patent [19]
Fukae et al.

[11] Patent Number: 6,072,421
[45] Date of Patent: Jun. 6, 2000

[54] MOVING OBJECT HIGH-ACCURACY POSITION LOCATING METHOD AND SYSTEM

[75] Inventors: Tadamasa Fukae; Norihiro Tamiya; Toyofumi Tani; Tadatomi Ishigami; Hiroshi Sato, all of Tokyo, Japan

[73] Assignee: Mitsubishi Denki Kabushiki Kaisha, Tokyo, Japan

[21] Appl. No.: 09/086,570

[22] Filed: May 29, 1998

[51] Int. Cl.[7] .............................. G01S 13/76; G01S 13/84
[52] U.S. Cl. ................. 342/42; 342/50; 342/126
[58] Field of Search .................. 342/70, 71, 72, 342/125, 126, 134, 135, 42, 44, 47, 50, 51

[56] References Cited

U.S. PATENT DOCUMENTS

| | | | |
|---|---|---|---|
| 4,229,737 | 10/1980 | Heldwein et al. | 342/46 |
| 4,278,975 | 7/1981 | Kimura et al. | 342/43 |
| 4,297,700 | 10/1981 | Nard et al. | 342/125 |
| 5,483,455 | 1/1996 | Lay et al. | 701/206 |
| 5,657,021 | 8/1997 | Ehsani-Nategh et al. | 342/70 |
| 5,675,344 | 10/1997 | Tong et al. | 342/457 |
| 5,684,490 | 11/1997 | Young et al. | 342/70 |
| 5,724,041 | 3/1998 | Inoue et al. | 342/70 |
| 5,731,781 | 3/1998 | Reed | 342/135 |
| 5,828,333 | 10/1998 | Richardson et al. | 342/70 |
| 5,872,536 | 2/1999 | Lyons et al. | 342/70 |

FOREIGN PATENT DOCUMENTS

| | | |
|---|---|---|
| 5-122120 | 5/1993 | Japan . |
| 227169 2A | 1/1994 | United Kingdom . |
| 230118 5A | 11/1996 | United Kingdom . |

OTHER PUBLICATIONS

Kurihara et al, "Proceedings of the 1997 Engineering Sciences Society Conference of the Institute of Electronics, Information and Communication Engineers", p. 103, (Aug. 26, 1997) with English Language excerpt.

*Primary Examiner*—John B. Sotomayor

[57] ABSTRACT

In an automated roadway system having transponders or data-stations spaced at known positions along the roadway, a vehicle mounted system determines the position of a vehicle moving along the roadway. A vehicle borne transmitter transmits a spread spectrum transmit signal which is pseudo (PN) encoded. The transmitted signal is received by the transponder which emits a reply signal back to a vehicle borne receiver. The receiver also receives a second signal which may be a reply signal from the same transponder or a reply signal from an adjacent transponder. The system then measures a time difference between transmission of the vehicle originated interrogation signal and receipt of its corresponding reply signal to determine the distance between the vehicle and the transponder or reflector. Based on the determined distances, the positions of the transponders and the distance that the vehicle has traveled during its communications, the position of a vehicle is determined using triangulation methods. The interrogation signals may be spread spectrum signals that are pseudo-random (PN) encoded. When the signal is detected by a receiver in the transponder or in the vehicle receiver, the PN code is synchronized to the incoming signal to accomplish maximum correlation. The phase delay between the transmitted PN code and received PN code is used to determine the distances between the vehicle and the transponder. The periodically located transponders produce a reply signal including a PN code and embedded data which represents the transponder identification and its position, or other data which is desirable to transmit between the transponder and the vehicle traveling the roadway.

28 Claims, 10 Drawing Sheets

FIG. 10

| 1 | VEHICLE LICENSE PLATE | VEHICLE SPEED | VEHICLE CODE | ... |

VEHICLE DATA

FIG. 11

| 0 | VEHICLE LICENSE PLATE | TRANSPONDER CODE | ... |

TRANSPONDER DATA

MOVING OBJECT HIGH-ACCURACY POSITION LOCATING METHOD AND SYSTEM

FIELD OF INVENTION

The present application is directed to a system and method for determining the position of a vehicle on a highway. The system and method of the present application is further directed to a system and method for determining the location of a vehicle on the highway while simultaneously providing a communication link between a so-called intelligent transportation system and the vehicle.

BACKGROUND OF THE INVENTION

There has been an increasing recognition throughout the world that highway traffic is becoming an increasing problem, both from the standpoints of highway congestion and safety. One solution to this problem is to dramatically increase the number of highways to thereby decrease highway congestion. However, considerable expense is associated with the development of new highways and such new highways demand that an increasing percentage of land be utilized to support such highways, thereby decreasing the efficiency of a society's land utilization. Furthermore, in congested areas, there is little realistic opportunity to construct new highways, as no additional space exists. Accordingly, there is a need to make current highways more efficient.

There have been several recent proposals to develop an intelligent highway system which would allow both increased highway safety and higher highway utilization. One proposal for such an intelligent highway system is to automatically monitor and control the position of each vehicle along the highway, enabling the control of vehicle following distances and braking profiles to increase highway safety while reducing the vehicle spacing requirements otherwise necessary with individual vehicle operator control.

In such automated highway systems, it is desirable for the roadway and/or each vehicle to monitor the vehicle's longitudinal and lateral position along the roadway. Further, in such systems, automated lane tracking may be considered desirable. In such automated highway systems, it is further desirable to supply each vehicle and the operator thereof with highway originated information of various types. For example, it may be desirable to provide the operator of each vehicle with traffic jam information, regulatory information, as well as road direction and parking information.

A supplemental advantage of such an intelligent transportation system is that, through interactive control of each vehicle by the highway, less acceleration and braking inputs are necessary, reducing the amount of stop and go traffic and additionally reducing fuel requirements and according decreasing resultant pollution.

One such automated highway system which has been proposed is under development primarily, for example, by Nissan Motor Company, Limited with the policy support of the Japanese Ministry of Construction. Such a system determines a vehicle's lateral placement along the roadway through the use of magnetic nails imbedded down the center of the road bed and monitored by a vehicle born magnetic nail sensor which determines the relative position of the vehicle with respect to the magnetic nails, and seeks to control vehicle position to center the vehicle over the magnetic nails.

In the magnetic nail lateral position measurement system, the magnetic nails have the ability of being locatable virtually anywhere. However, the ability to monitor such magnetic nails is subject to severe degradation and depends on weather conditions. For example, a snowstorm may make such a lateral position measuring system unusable. Further, the use of such magnetic nails increases the complexity of roadway maintenance. For example, roadway resurfacing encounters significant difficulties when imbedded magnetic nails are present.

In the above-mentioned system, vehicle position longitudinally along the roadway is determined through the use of a global positioning satellite system (GPS). Each vehicle receives GPS signals and decodes them to determine the vehicle's own position. Such a GPS recorded position is integrated with velocity, acceleration, and yaw rate vehicle mounted sensors to produce a real time kinematic estimate of vehicle position. In such a kinematic-GPS system, while accurate longitudinal position of the vehicle may be developed, the GPS signals are not available under trees, bridges, or in tunnels, thereby limiting system usability.

The above-mentioned system further utilizes a road-to-vehicle communication system which comprises a vehicle mounted antenna communicating with a leakage coaxial cable installed along the roadway shoulder. However, this communication system must be installed separately from the above-mentioned systems, thus adding to expense.

SUMMARY OF THE INVENTION

The concepts of the present application overcome substantial disadvantages of the known automated highway systems. With respect to vehicle location, the system of the present invention employs a vehicle mounted transmitter which transmits a vehicle identifying signal to transponders or data stations periodically mounted above the road level that have their own location data. The signals may be carried by light wave, radio wave or sound wave. In one preferred embodiment, the transponder may be mounted to a pole or any structure located along the roadway, such as a highway guardrail or a tunnel, highway or building wall or the like. The use of the above mentioned structures to support the transponder has several advantages. The mounted transponder surface is less susceptible to lateral position measurement degradation due to inclement weather such as snow, sleet, rain or the like. Precipitation is more likely to cover the roadway and magnetic nails embedded therein than it is likely to obstruct the communication path between the transponder and the vehicle. Accordingly, as compared to roadbed mounted magnetic sensors, reliable accurate position measurement using such a roadside located transducer is less dependent on weather.

The periodically mounted longitudinal position transponders are responsive to the vehicle borne interrogation signal and produce a reply or information signal indicative of the vehicle's position. Each transponder can receive the interrogation signal from any angle and transmit the reply signal back to the vehicle at another angle. The transponder may also include a delay circuit that inserts a delay between receipt of the interrogation signal and transmission of the reply signal. Such a system employing transponders has significant advantages over the known kinematic-GPS system. First, such a system may include roadside transponders mounted in tunnels or in other places where GPS reception would be obscured. Second, the interrogations and replies from the transponders may also be used for communication through the use of messages transmitted therewith.

A further advantage is obtained through the use of the vehicle transmitted interrogation signal containing a spread spectrum PRN (pseudo-random noise) code. Such spread spectrum PRN codes may be made virtually unique, effectively eliminating the risk that the transmission from a first vehicle will produce a reflection received by a second vehicle. Signals may also be modulated by analog for example, AM, PM or FM, or digital signals. Examples of digital signal modulation include Amplitude Shift Keying (ASK), Phase Shift Keying (PSK) and Frequency Shift Keying (FSK).

An even further advantage is obtained through the use of the transmitter transmitting a second vehicle identifying signal toward either the same transponder or an adjacent transponder. The receiving transponder will transmit this reply signal toward the vehicle. The additional signals provide the system with advantages over a system using a single set of interrogation and reply signals because the exact vehicle position can be determined by using triangulation methods and the information obtained from the additional signals. The above discussed transmissions may be transmitted at any known or unknown angle toward the intended transponder or vehicle.

The vehicle position determining system of the present invention uses the same roadside located infrastructure to accurately determine vehicle position for the benefit of the vehicle and the roadway system, and to allow the communication of additional messages. It is accordingly apparent that the system of the present invention is substantially improved over the known prior art.

BRIEF DESCRIPTION OF THE DRAWINGS

The present invention will become more fully understood from the detailed description herein below and the accompanying drawings which are given by way of illustration only, and thus are not limitative of the present invention.

FIG. 10 illustrates an example vehicle unique originated data signal transmitted by the vehicle mounted system 10.

FIG. 11 illustrates an example transponder unique identification data signal transmitted by the transponder 44.

DETAILED DESCRIPTION OF PREFERRED EMBODIMENTS

Figure 1:
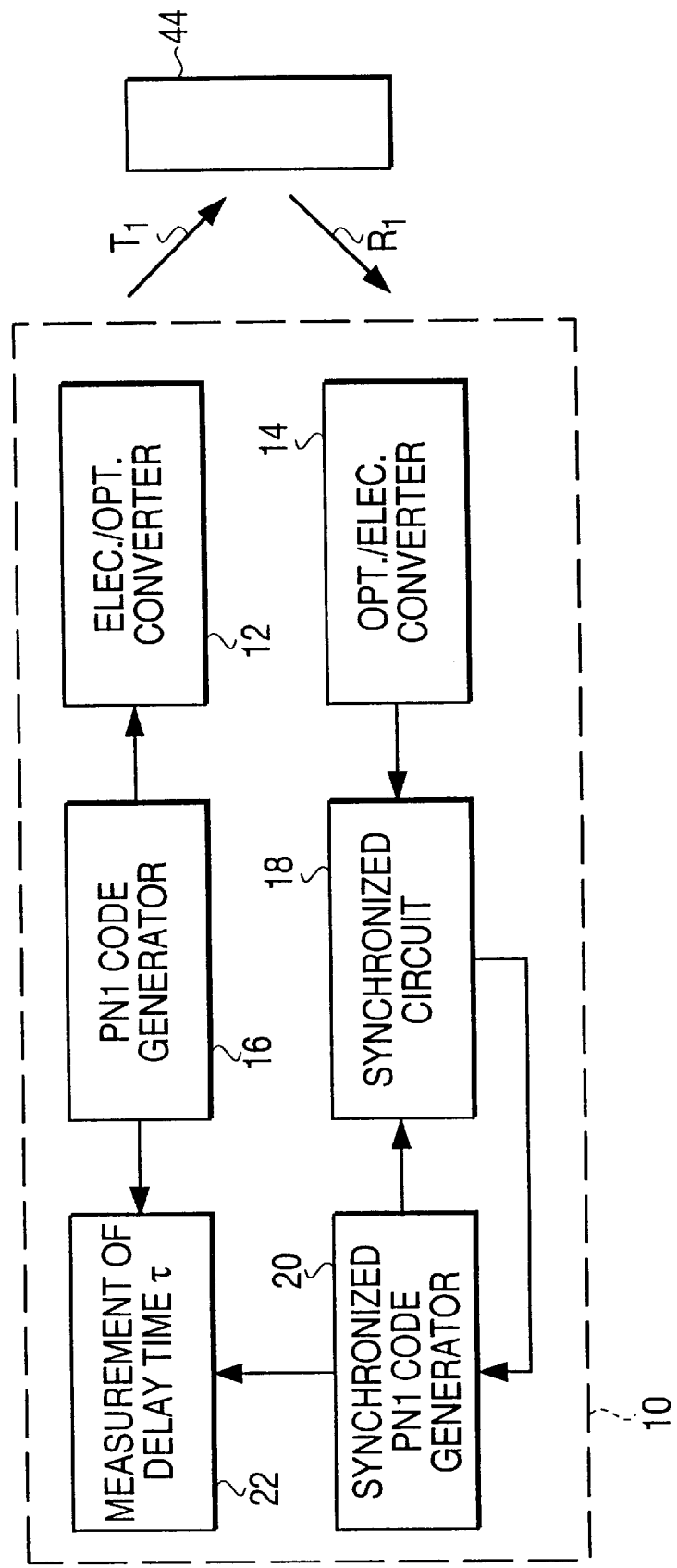
FIG. 1 is a schematic view illustrating one embodiment of the invention of the present application.

The exemplary embodiments of the invention claimed in the appended claims may be more fully appreciated by reference to the following description of preferred embodiments. Within the drawing figures, it should be understood that like elements are identified by like reference numbers.

An exemplary vehicle mounted system in accordance with a first embodiment is described with reference to FIG. 1 of the instant application. In basic principal, the system of the present application utilizes a vehicle mounted system 10, mounted on a vehicle 4 (see FIG. 4), to transmit an optical or electrical signal at an unknown angle along a transmitted path T to a data station or transponder 44, which receives the signal and transmits a responding optical or electrical reply signal along a transmitted path R back to the vehicle mounted system 10. By calculating the time delays between transmission and reception, the distance between the vehicle mounted system 10 and the transponder may be easily ascertained. Moreover, by using well known triangulation methods, the actual position of the vehicle on the roadway may also be easily ascertained, as discussed below. This simple principle of transmission and receipt of a generated signal transmitted from a transponder 44 is in practice difficult to use in a real world environment.

For example, in a real world roadway, plural vehicles are travelling along the same roadway substantially simultaneously. Thus, in order for the vehicles to safely travel the roadway, it is necessary for the transmitted signal from each vehicle to be identifiable. According to the teachings of the present invention, a pseudo-random noise (PR) or (PN) code is utilized. This type of code simulates a random sequence and therefore possesses an auto correlation function which appears substantially uncorrelated when the PN signal is not phase matched with itself while appearing highly correlated when phase matched with itself.

Such codes are typically generated in a known fashion by use of a shift register with linear feedback. In one preferred embodiment of the present application, the PN code is generated by a 7-stage shift register with linear feedback which produces a sequence having a period $N=2^7-1$. The vehicle mounted system 10 utilizes a PN code generator 16 of this known type to generate a PN code at least substantially unique to the vehicle on which the system is mounted. This PN code modulates the data and is transmitted by electrical/optical converter 12.

In the case of optics, the intensity of the transmitted light wave produced in accordance with the teachings of the present application is directly modulated by the PN code modulated data. For example, a logical "1" turns on the light output while a logical "0" turns off the optical output. Alternatively, the teachings of the present application are also applicable to the use of other radiation wavelengths. For example, in the case of millimeter waves, a carrier may be modulated by the PN code to alternate between 2 different phase states, for example, 0° and 180° to accomplish a type of phase shift keying (PSK).

To more clearly describe the vehicle mounted system shown in FIG. 1, we initially assume that transponder 44, for purposes of explanation only, is reflecting the optical/electrical signal. Accordingly, the optical signal transmitted on the transmitted path T is reflected from the transponder 44 and redirected toward the vehicle and its associated vehicle mounted system 10 along the received path R. A receiver or optical/electrical converter 14 receives the received optical signal, which is a delayed form of the originally transmitted PN code. A synchronized circuit 18 and synchronized PN code generator 20 collectively determine the phase delay between the transmitted PN code and the received PN code.

The synchronized circuit 18 compares the received signal to a synchronized PN code which is a selectively delayed example of the PN code generated by the PN1 code generator 16 used to modulate the optical signal. The synchronized PN1 code generator 20 may add or subtract a time delay to the PN code, originally generated by the PN1 code generator 16 in any desired fashion in order to obtain synchronization. For example, the synchronized PN1 code generator 20 may sequentially add a time delay to the PN code generated by the PN1 code generator 16 one pulse or chip at a time until maximum correlation is ascertained between it and the received PN modulated signal obtained on the received path R. Alternatively, if approximate correlation is known based upon, for example, the immediate proceeding sample, the synchronized PN1 code generator 20 may selectively increase or decrease the phase delay determined from the immediate preceding sample in order to seek maximum correlation of the PN code representative of phase correlation.

For example, in one embodiment, the synchronized PN1 code generator 20 may selectively increase the delay added to the PN code produced by the PN1 code generator 16 until initial correlation with the initial reflective signal is ascertained. Thereafter, the phase of the synchronized PN code generated by the synchronized PN1 code generator 20 may be added to and subsequently subtracted to by a delay lock loop (DLL).

The output of the synchronized PN1 code generator 20 is compared to the received reflected optical or electromagnetic signal produced by the transmitter 12 and received by the receiver 14 through the use of a simple comparison counter. For example, the synchronized circuit 18 may comprise a comparator comparing the stages of plural bit shift registers, which have the received optical signal and synchronized PN code loaded therein. Thus, when a phase match is present, the output of the comparator or correlator will indicate maximum correlation and then the phase delay between the PN code transmitted and received will be known.

Once the phase of the PN code output from the synchronized PN1 code generator 20 is known, a delay measurement and lateral distance calculation is performed in the delay measurement and lateral distance calculation circuit 22 to determine the phase delay between the synchronized PN code output from the synchronized PN1 code generator 20 and the PN code initially generated by the PN1 code generator 16. As the transmit and received paths are actually substantially parallel when the system is utilized in the real world, and since the speed of propagation of an optical or radio signal is well known, the distance the optical or electromagnetic signal travels may be calculated. About one half of this distance is the distance between the vehicle mounted system 10 and the target transponder 44. Thus, the system of the present application may readily calculate the distance between the vehicle 4 on which it is mounted and the target transponder 44 because the delay measurement and lateral distance calculation circuit 22 has a DLL locked to the same frequency standard as a DLL in the transponder 44. In a preferred embodiment, the target transponder 44 may be attached to a precisely located highway guardrail, pole, wall or another structure that supports the transponder above ground level.

Figure 2:
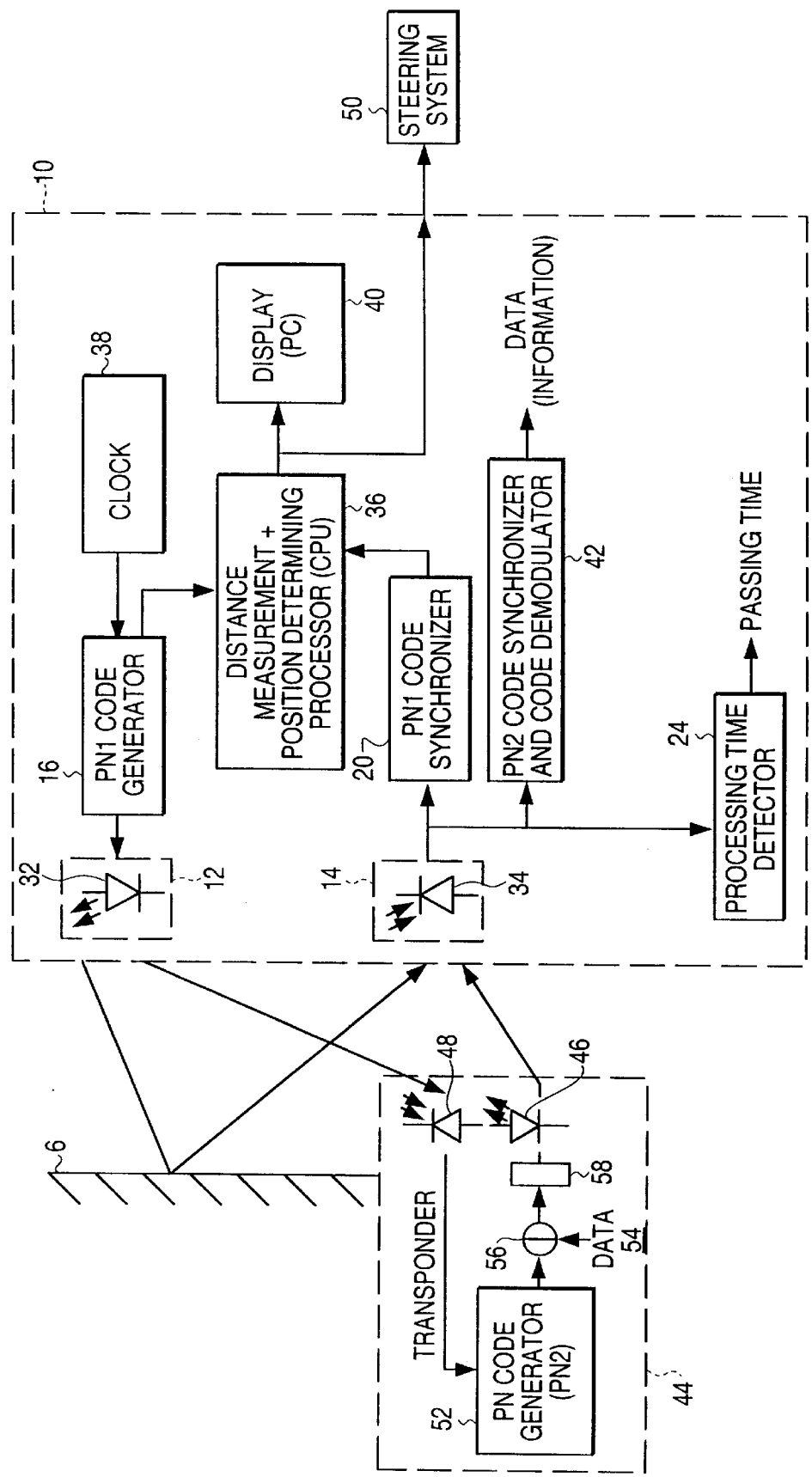
FIG. 2 is a schematic view of a vehicle mounted system including circuitry for communication with roadway mounted transponders.
Figure 3:
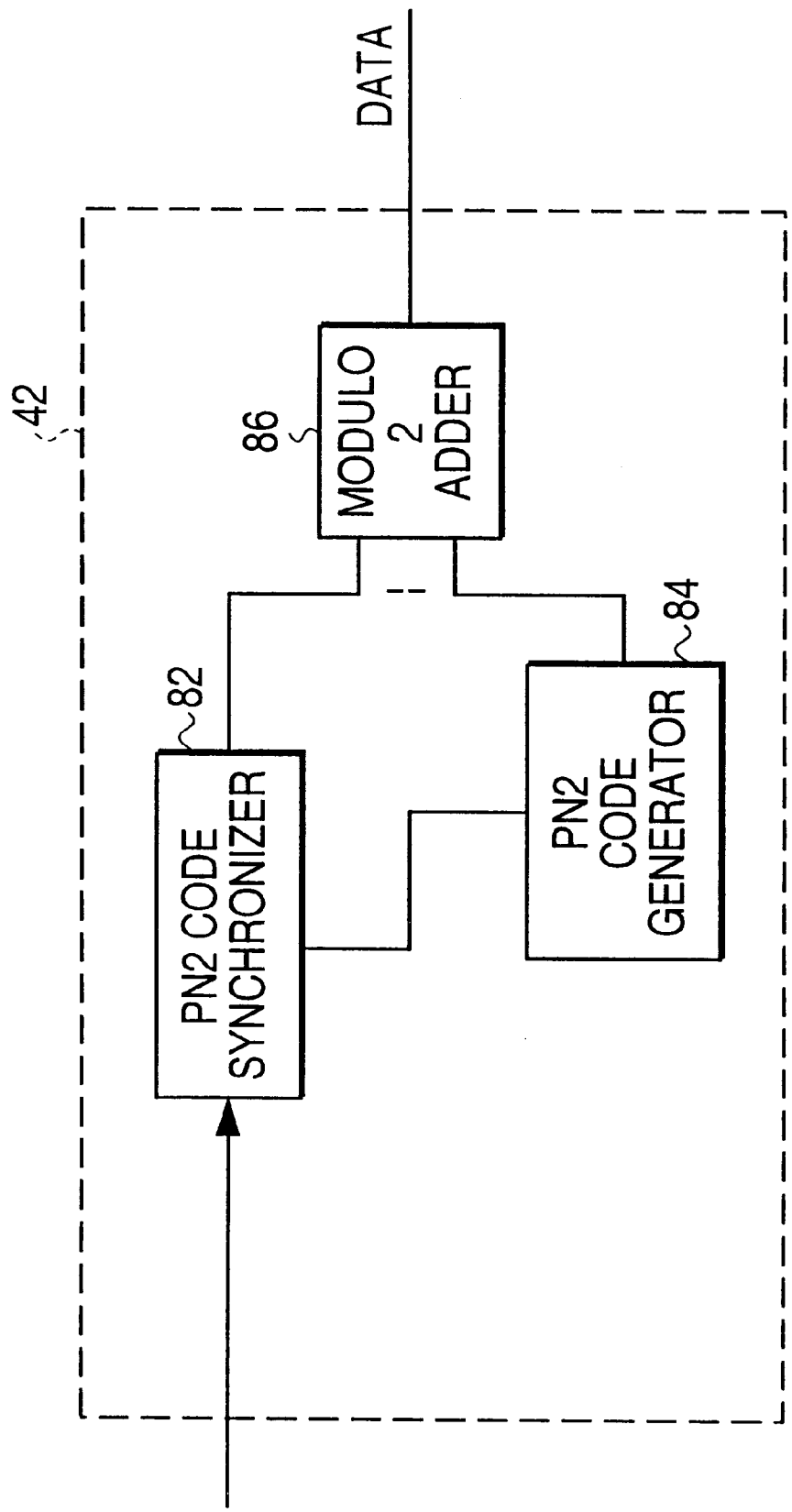
FIG. 3 is a schematic illustrating the detail of the PN2 code synchronizer and code demodulator 42 of FIG. 2.

FIGS. 2 and 3 of the instant application describe further details of the embodiment of FIG. 1, which details may also be utilized to transmit data from the periodically located roadway transponder 44 to the vehicle mounted system 10.

FIG. 2 also shows additional details of the vehicle system 10. The vehicle system 10 of FIG. 2, in one preferred embodiment, illustrates the use of an infrared LED to transmit the optical signal toward the transponder 44 in accordance with the teachings of the instant application. The infrared LED 32 which is part of the electrical/optical converter or transmitter 12 transmits a PN code generated under control of a clock 38 also illustrated in this figure.

The reflection of this PN code encoded optical signal is received by an infrared photo detector 34 which is part of the receiver or optical/electrical converter 14. The received PN code is then synchronized in the manner already described with reference to FIG. 1 and distance measurement is performed by a distance measurement and position determining processor 36 in substantially the same way the delay measurement and lateral distance calculation circuit 22 operates. This distance measurement and position determining processor 36 performs delay measurement and lateral distance calculation and is equivalent to the delay measurement and lateral distance calculation circuit 22 of FIG. 1. The processor 36 then uses triangulation methods to determine the actual position of the vehicle 4 based on the outputs of the distance measurement and the known positions of the transponder 44. The output of the distance measurement and position determining processor 36 may be displayed on a display 40. Additionally, the output of processor 36 may be supplied as an output of the vehicle mounted system 10 which is then supplied to the steering system 50. The steering system 50 adjusts the vehicle steering so as to maintain the distance measurement output from the distance measurement and position determining processor 36 constant, thereby maintaining the vehicle 4 in the center of the selected lane 2a.

Another aspect of the present application allows roadway based information to be communicated to the vehicle using the receiver or optical/electrical converter 14 of the vehicle. As explained above with reference to FIG. 2, a plurality of periodically located roadway transponders 44 are provided along the roadway 2. Each of these periodically located roadway transponders 44 is responsive to receipt of the PN code modulated optical signal transmitted by the transmitter of electrical/optical converter 12 which is optically received by a roadway transponder photo detector 48. Receipt of the PN modulated optical signal from the vehicle mounted system causes the periodically located roadway transponder 44 to generate a transponder originated signal which is modulated by the PN code and which includes data modulated therein. The PN code modulation may be completely repeated for each data bit.

This transponder originated signal includes a PN code representative of a transponder transmission which is multiplexed with data provided to a roadway transponder data input 54 using a roadway transponder signal multiplexer 56. The transponder originated signal is output from a roadway transponder infrared LED 46 for receipt by the receiver or optical/electrical converter 14 of the vehicle mounted system 10. The output of the transponder 44 includes a PN code PN2 and an embedded data message. The PN code PN2, in the preferred embodiment, may include some of the vehicle unique identification code generated by the PN1 code generator 16. The PN code PN2 of the PN2 code generator 52 is therefore known to a PN2 code synchronizer and code demodulator 42. The PN code PN2 will be different for each transponder/vehicle because the code will include an identification code unique to each vehicle and an identification code unique to each transponder. The code demodulator functions similarly to the circuitry described in FIG. 1, recognizing the PN2 code transmitted by each periodically located, roadway transponder 44 when interrogated by the PN1 encoded signal transmitted by the vehicle mounted system 10.

The roadway transponder signal multiplexer 56 is, in the preferred embodiment, a modulo 2 adder which adds the spread spectrum code to the data to produce high speed composite data. The intensity of the transmitted light wave output from the roadway transponder infrared LED 46 is thereafter directly modulated by the spread spectrum or high speed composite data. The vehicle mounted system 10 utilizes a PN code synchronizer such as that described above with respect to FIG. 1, to synchronize the known PN2 code to the PN2 code transmitted by the interrogated transponder. The synchronized PN2 code is then modulo 2 added to the received high speed composite data to recover the desired data.

Additionally, each transponder desirably has a unique ID signal associated therewith and representing the longitudinal position of the transponder along the roadway. From this signal the longitudinal position of the vehicle along the roadway may be determined. For example, each transponder may correspond to a highway milepost, the transponders being located at mileposts 27.1, 27.2, etc. Since the ID of each transponder is transmitted (preferably with a time stamp of the time of transmission), the vehicle will know its position as it passes each transponder and can easily interpolate position therebetween. However, the system and method of the present application desirably determines the instant the vehicle 4 passes each transponder 44 so as to more accurately determine instantaneous vehicle position.

FIG. 3 of the instant application illustrates further details of the PN code synchronizer and code demodulator 42 of FIG. 2. The PN code synchronizer and code demodulator 42 includes a PN2 code synchronizer 82, a PN2 code generator 84 and a data modulo 2 adder 86. The PN2 code synchronizer 82 performs in a way similar to the PN1 code synchronizer 20 to synchronize the PN2 code to the received signal. The incoming signal is synchronized to the PN code generated by the PN2 code generator 84, and modulo 2 addition is performed by a data modulo 2 adder 86 which extracts the PN code from the modulated data. The data output therefrom is then utilized in any desired fashion. For example, this data may be highway map data, traffic condition data, GPS generated position data or any other type of data considered desirable for transmission from transponder 44 to vehicle 4.

Figure 4:
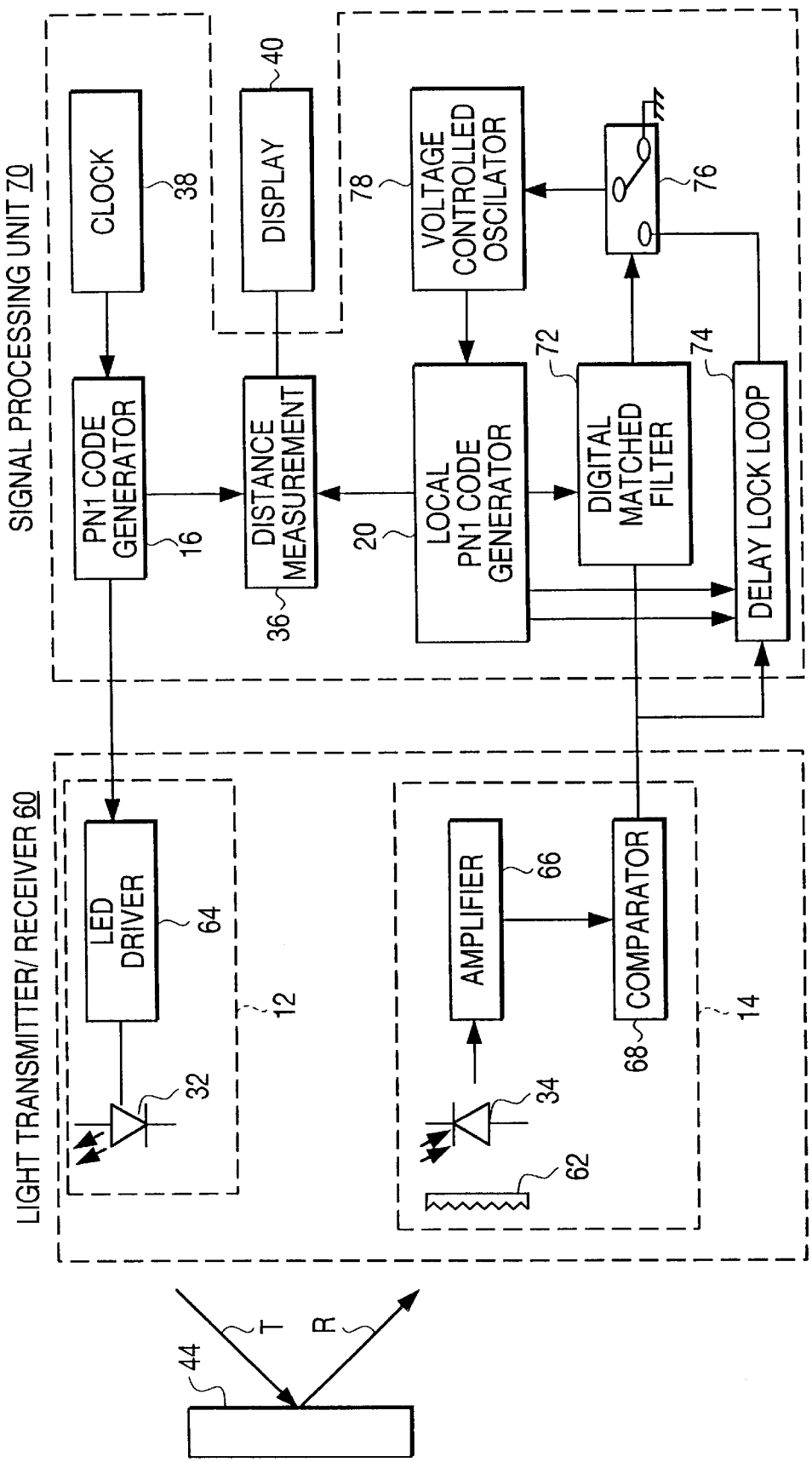
FIG. 4 is a schematic view illustrating the infrared transmission LED, photo detector and additional details of the associated signal processing circuitry used in an exemplary vehicle mounted system.

FIG. 4 of the present application describes still further details of system of the present application. The circuitry of the vehicle mounted system 10 of FIG. 1 is divided into a vehicle mounted light transmitter/receiver portion 60 and a vehicle mounted signal processing unit portion 70. The light transmitter/receiver portion 60 of the vehicle mounted system 10 includes the infrared LED 32 driven by an LED driver 64. The receiver or optical/electrical converter portion of the light transmitter/receiver portion of the vehicle mounted system includes an infrared photo detector 34 whose output is amplified by an amplifier 66 and then threshold detected by a vehicle mounted system receiver comparator 68 which compares the received signal to a threshold to square off the edges of the detected digital pulses.

The output of the comparator 68 is provided to the signal processing unit portion 70 of the vehicle mounted system 10.

The signal processing unit portion 70 of FIG. 4 illustrates the synchronized PN code generator 20 and synchronized circuit 18 of FIG. 1 in greater detail. A local PN code generator 20 generates a PN1 code equivalent to that of the PN code generator 16. However, the local PN code generator 16 is not clocked by a fixed frequency clock 38, but rather, is clocked by a voltage controlled oscillator 78 which clocks the local PN code generator at a speed selected under control of the delay lock selector switch 76.

The delay lock selector switch 76 switches the control terminal of the voltage control oscillator 78 between ground during the synchronization period and a delay lock loop 74 during periods when the PN2 code produced, by the local PN2 code generator 16 is locked to the PN1 code being output from the comparator 68. A digital matched filter receives the output of the comparator 68 (the signal received from the transponder) in a first register and compares that output to a PN code portion generated by the local PN2 code generator 20 which is loaded into a second register. The content of each of the bit locations of the two registers are compared in a comparison counter which generates an output representative of the degree of correlation between the PN1 code. When the contents of the register receiving a portion of the local PN code generator 16 are substantially the same as the contents of the register receiving a portion of the output of the comparator, the comparison counter monitoring the content of these two registers produces a high correlation value indicative of digital signal match.

When digital signal match is detected by the digital matched filter 72, the digital matched filter 72 controls the actuation of switch 76 to connect the delay look loop 74 to the control input of the voltage controlled oscillator 78. The delay lock loop 74 performs in a manner known to those of ordinary skill in the art and in substantially the same way as a well known phase lock loop. The delay lock loop 74 calculates the time delay needed to completely cycle the output of the comparator 68 through a register of the digital matched filter 72. Once delay lock is achieved, small control inputs are supplied to the voltage control oscillator 78 to vary the speed of generation of the local PN code to create a delay match (a kind of phase match) as is well known.

Once a delay match is accomplished, the phase delay between the local PN code generated by the local PN code generator 20 is compared to the PN code generated by PN code generator 16 to achieve a delay which is representative of 2$d$.

Figure 5:
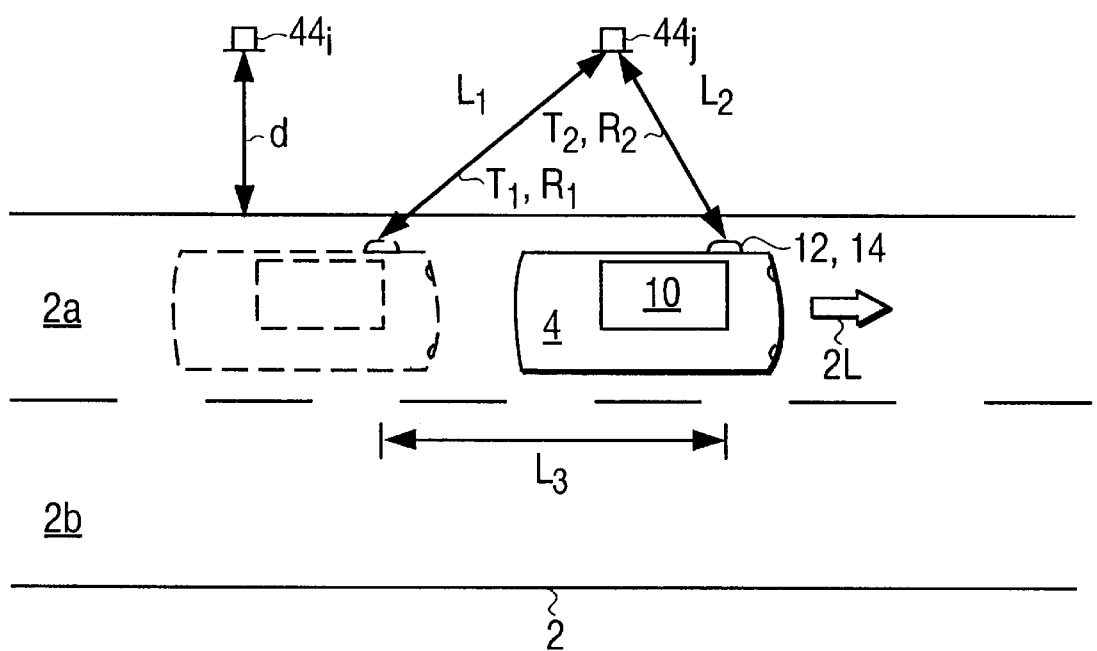
FIG. 5 is a schematic top view of a vehicle 4 travelling down a roadway 2 and communicating with a roadway transponder 44 at two different time periods.

FIG. 5 of the instant application illustrates a vehicle 4 employing a vehicle mounted system 10 having a transmitter and receiver 12,14 mounted thereon travelling a desired direction 2L along a first lane 2$a$ of a roadway 2 having first and second lanes 2$a$,2$b$. The transmitter/receiver 12,14 of the vehicle 4 communicates with a transponder 44, which may be mounted to a highway guardrail located adjacent to the roadway 2. The transponder 44 may also be a part of a tunnel or highway wall or any surface which is adjacent to the roadway. The location of transponder 44 is unambiguously known.

As explained with reference to FIG. 1, the transmitter and receiver can communicate with a plurality of periodically located roadway transponders 44 which may be mounted in any desired location along the roadway. These periodically located transponders 44 receive the optical or electromagnetic signal transmitted from the transmitter 12 of the vehicle as an interrogation signal and transmit a reply signal having desired information to the vehicle in response thereto.

The vehicle 4 transmits and receives two sets of optical/electrical signals communicatively with a single transponder $44_j$. That is, while vehicle 4 is travelling in a desired direction 2L along a first lane 2a of a roadway 2 having first and second lanes 2a, 2b, the transmitter/receiver, 12, 14 of the vehicle 4 transmits an optical or electromagnetic interrogation signal along transmitted path $T_1$ to transponder $44_j$, which sends a response optical or electromagnetic signal along received path $R_1$ to the receiver 14. After a known time delay τ, transmitter 12 transmits a second optical or electromagnetic interrogation signal along path $T_2$ toward the same transponder $44_j$, which sends a response optical or electromagnetic signal along received path $R_2$ to the receiver 14. The first and second response signals sent from transponder $44_j$ to the receiver 14 are substantially identical.

As discussed above, as the transmit and receive paths are substantially parallel when the system is utilized in the real world, and since the speed of propagation of an optical or electromagnetic signal is well known, the distance that the optical or electromagnetic signal travels may be determined by a triangulation method. Thus, the distance $L_1$ between the vehicle mounted system 12 and the transponder $44_j$ at a time $t_1$ and the distance $L_2$ between the vehicle mounted system 10 and the transponder $44_j$ at time $t_2$ may easily be determined. In addition, because the time τ between sending/receiving the first and second signals is known, and the velocity V of the vehicle 4 is known, the distance $L_3$ that measures the distance of the vehicle 4 between communication of the two sets of signals may be calculated as vehicle speed V multiplied by time τ. Once lengths $L_1$, $L_2$ and $L_3$ are calculated, then the position of vehicle 4 at times $T_1$ and $T_2$ can be determined using triangulation methods since the location of $44_j$ is unambiguously known. Accordingly, the location of a vehicle 4 moving along the roadway 2 can be determined by the system of the present invention, even when the angles of communication between the transmitter 12/receiver 14 and a transponder 44 are unknown.

Figure 6:
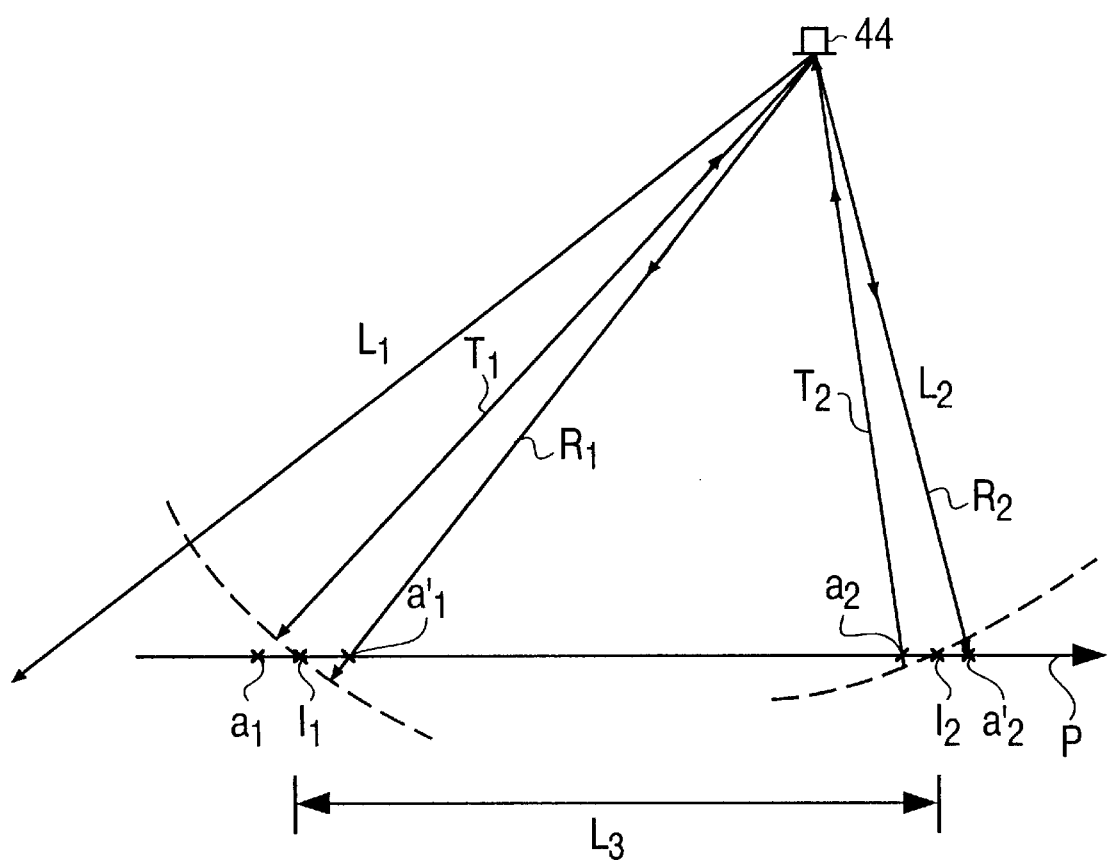
FIG. 6 illustrates an example of a triangulation method for accurately determining the position of vehicle 4 at two different time periods.

FIG. 6 illustrates an example triangulation method for determining the vehicle position when the transponder 44 incorporates a time delay $τ_0$. The time delay refers to the time period required for the transponder to prepare the response signal to be transmitted to the moving vehicle. The response signal includes vehicle ID and transponder ID.

In FIG. 6, a vehicle (not shown) moving along path P transmits optical or electromagnetic signals at about positions $a_1$, $a_2$ along transmitted paths $T_1$, $T_2$. The transponder 44 sends response signals toward the moving vehicle along received paths $R_1$, $R_2$ after time delay $τ_0$. The response signals are received by the moving vehicle moving along path P at about locations $a'_1$ and $a'_2$. Because the position of transponder 44 and the distance $L_3$ that the vehicle travels between the two sets of signals are known, the position of the vehicle during the communication can be estimated. $L_1$ and $L_2$ are assumed to be about one-half of the distance that each set of transmit and respond communication signals travels. Using the known position of the transponder as a center point, two circles can be drawn having respective radii of $L_1$ and $L_2$. Then the intersections $I_1$, $I_2$ of the circles separated by distance $L_3$ in the direction of path P correspond to the location of the vehicle during each transmission/response set of communications with the transponder 44.

It is also possible to determine length $L_2$ when the transmitter 12 only transmits one optical or electromagnetic interrogation signal to the transponder $44_j$. Instead of responding to a second interrogation signal, transponder $44_j$ transmits a second response signal along received path $R_1$ to receiver 14. In other words, the transponder $44_j$ transmits two response signals in response to only one interrogation signal. Upon receipt of the interrogation signal, transponder $44_j$ sends a first response signal along receive path $R_1$ to receiver 14. After a known time delay τ, transponder $44_j$ sends a second response signal along receive path $R_2$ to the receiver 14. The first and second response signals sent from transponder $44_j$ to the receiver 14 are substantially identical, except that, the second response signal may include the time delay τ. $L_2$ can then be determined as the time from transmission of the interrogation signal to receipt of the second response signal minus the time delay times the speed of propagation of the signal minus the distance of length $L_1$.

An additional calculation step is required to determine vehicle position in this manner because the time delay τ and the total time for the vehicle to travel distance $L_3$ must be known to determine the position of the vehicle at $T_1$ and $T_2$. However, this should not pose a serious burden, especially if, for example, each transponder were set to have the same time delay τ. The other translation methods discussed above and below provide the benefit of working without knowledge of the time delay τ and total time.

Figure 7:
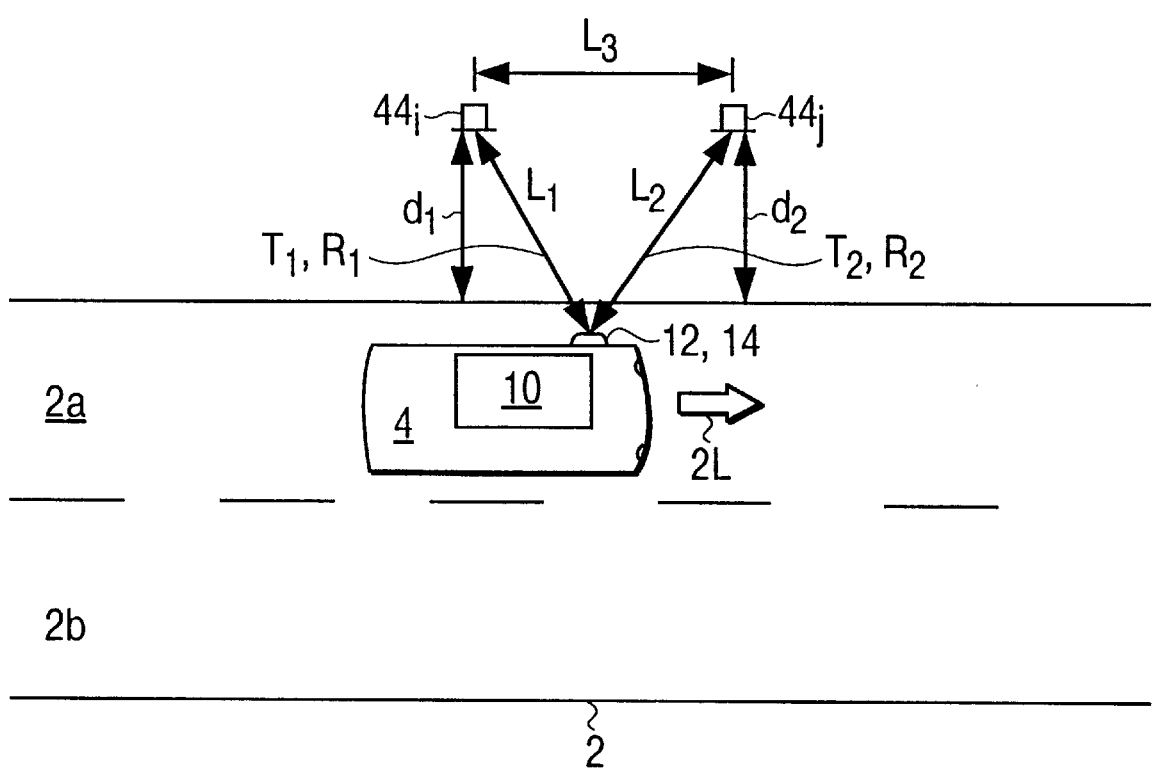
FIG. 7 is a schematic top view of vehicle 4 travelling down roadway 2 and simultaneously communicating with roadway transponders $44_i$ and $44_j$.

The position of vehicle 4 can also be determined by the calculation of time signals from multiple transponders. FIG. 7 of the instant application illustrates a vehicle 4 employing a vehicle mounted system 10 having a transmitter and receiver 12, 14 mounted thereon travelling a desired direction 2L along a first lane 2A of a roadway 2 having first and second lanes 2A, 2B as illustrated in FIGS. 2 and 5. However, the transmitter/receiver 12, 14 of the vehicle 4 simultaneously communicates with two transponders $44_i$ and $44_j$ to obtain the true position of the vehicle. The receiver 14 can distinguish the received signals from the transponders $44_i$ and $44_j$ because each signal includes a transponder unique identification data that is different for each transponder 44.

In FIG. 7, the vehicle mounted system 10 simultaneously transmits an optical/electromagnetic signal toward both transponders $44_i$ and $44_j$ along respective transmitted paths $T_1$, $T_2$. Transponders $44_i$ and $44_j$ receive the transmitted signals and send reply signals back to receiver 14 along respective paths $R_1$, $R_2$.

The location of transponders $44_i$ and $44_j$ are known. Thus, the distance $L_3$ between transponders $44_i$ and $44_j$ is also known. The known locations and distances may be transmitted from the transponders 44 as part of the reply or information signals transmitted back to the receiver 14. As discussed above, since the transmit and receive paths are substantially parallel when the system is used in the real world, and since the speed of propagation of an optical or electromagnetic signal is well known, the distances $L_1$ and $L_2$ between the vehicle mounted system 10 and the transponders $44_i$, $44_j$ may be calculated as about one half the distance that the optical or electromagnetic signals travel. The location of the vehicle 4 can be determined in accordance with the following triangulation method. First, using the known position of transponder $44_i$ as a first center, draw a first circle having a radius of length $L_1$. Then, using the known position of transponder $44_j$ as a second center, draw a second circle having a radius of length $L_2$. The position of vehicle 4 is calculated as the point of intersection of the two circles on the roadway. Accordingly, the system of the present application may readily calculate the actual position of the vehicle 4 on the roadway 2.

Figure 8:
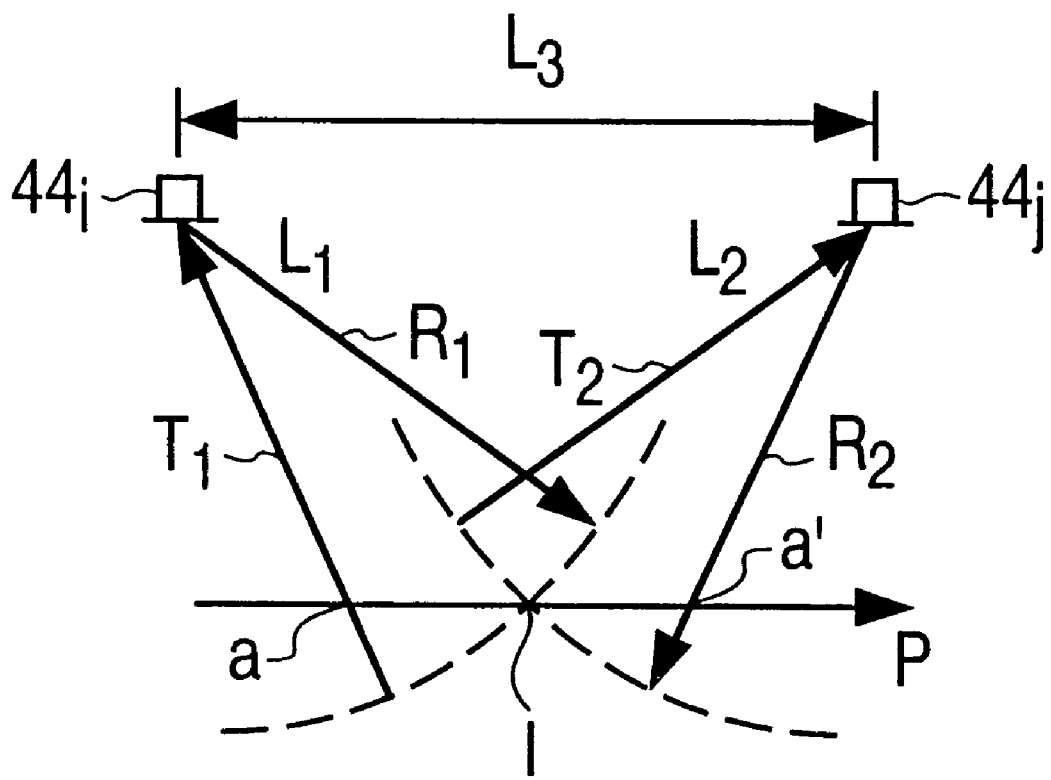
FIG. 8 illustrates a triangulation method for determining the location of a vehicle travelling along path P and simultaneously communicating with roadway transponders $44_i$ and $44_j$.

The location of the vehicle may also be determined when the transponders 44 incorporate a time delay between receiving and transmitting signals. As previously discussed, the time delay is the time period necessary for a transponder 44 to prepare a response signal for transmitting to the moving vehicle. FIG. 8 illustrates an example triangulation method for determining the position of the vehicle when such a time delay $\tau_0$ exists.

In FIG. 8, path P represents movement of a vehicle which simultaneously transmits interrogation signals along transmit paths $T_1$ and $T_2$. Transponders $44_i$ and $44_j$ receive the respective interrogation signals and transmit respective responding signals toward the vehicle 4 (not shown) at about location a'. The locations of the transponders $44_i, 44_j$ are known. Also, lengths $L_1$ and $L_2$ can be determined as previously discussed in regards to FIG. 6. Therefore, the position of a vehicle moving along path P during the transmission/reception of the signals can be estimated as the intersection I of circles having respective centers $44_i$ and $44_j$ and radii lengths $L_1$ and $L_2$.

Figure 9:
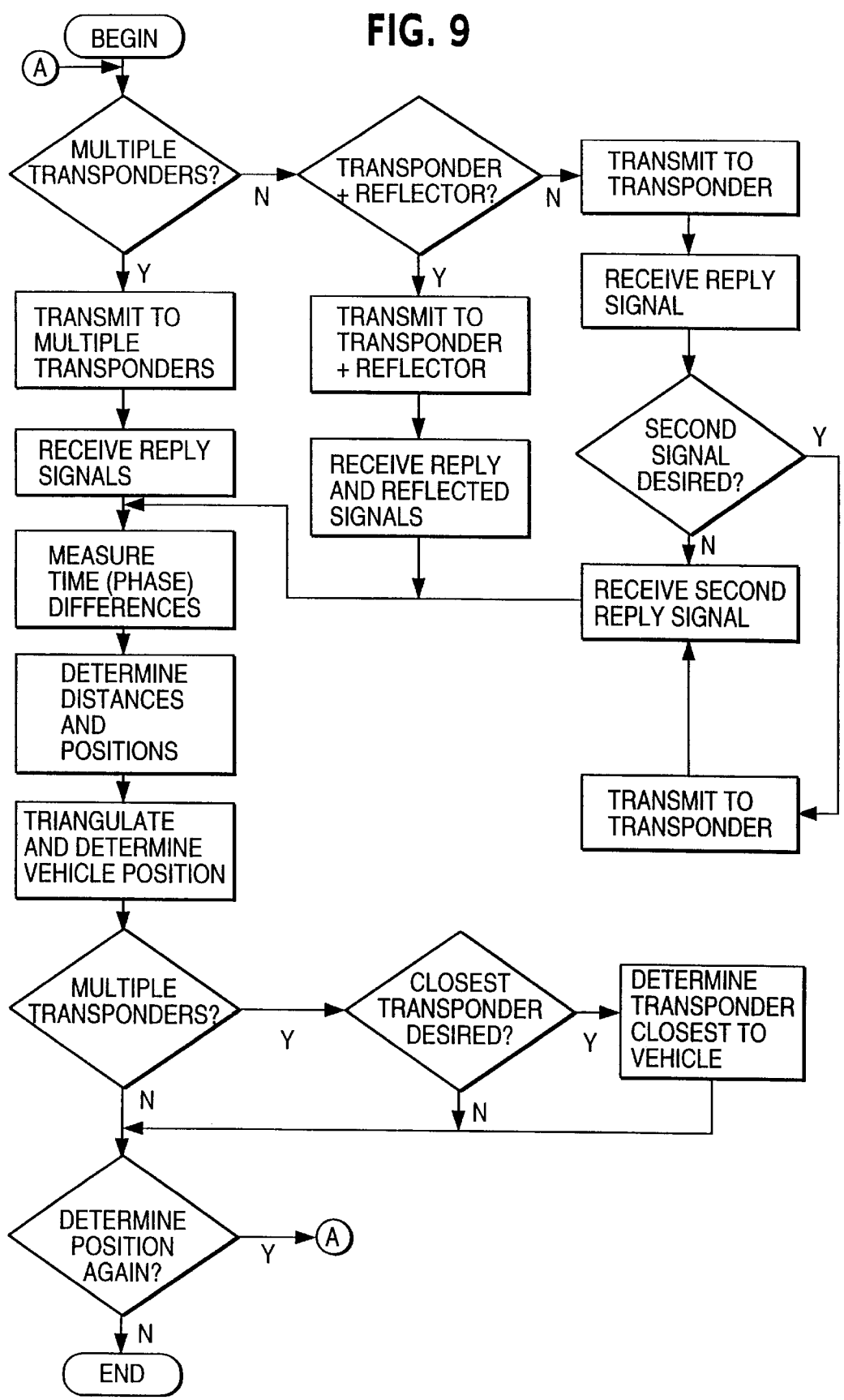
FIG. 9 is an example flowchart illustrating the processing steps associated with the preferred embodiments of the present invention.

FIG. 9 is an example flow chart illustrating the processing steps of the preferred embodiments of the position locating system.

The vehicle mounted system 10 first determines how it will communicate with the transponders. That is, whether the system will triangulate using data obtained from multiple transponders or from a single transponder. This determination may be necessary for each successive vehicle position determination because the system may need to switch between the different communication approaches discussed above. It may be more beneficial to change communication approaches based on the conditions of the roadway system, and any environment or weather. For example, it may be beneficial to triangulate using a single transponder when the vehicle is travelling through a construction zone, because some transponders may be blocked by construction machinery or other objects. In this environment, it would be more difficult to triangulate using two transponders simultaneously due to the possibility that one of the transponders may be inaccessible to communicate with the vehicle. Accordingly, it would be beneficial to use a communication approach that triangulates based on communication with a single transponder in an environment where successive transponders may be inaccessible to ensure accurate vehicle position determinations. The vehicle position determination system of this application can therefore switch to different communication approaches as desired to most effectively determine vehicle position.

If the vehicle mounted system 10 will determine the next position of the vehicle by triangulating with multiple transponders, then the vehicle mounted system 10 transmits an optical/electromagnetic signal toward the multiple transponders 44 and receives reply signals from the transponders along respective transmitting paths T and R as shown, for example, in FIG. 7. If the vehicle mounted system 10 will determine the vehicle position by communicating with a single transponder 44 and a reflector, then the vehicle mounted system 10 transmits an interrogation signal and receives a reply signal from a transponder along path $T_1 R_1$ as shown, for example, in FIG. 5.

If the vehicle mounted system 10 will determine the vehicle position by communicating with a single transponder 44, then the vehicle mounted system 10 transmits an interrogation signal toward the transponder 44 along path $T_1$ and receives a reply signal from the transponder 44 along path $R_1$ as shown, for example, in FIG. 5. If a second interrogation signal is desired, then the vehicle mounted system 10 transmits a second interrogation signal toward the transponder along path $T_2$ and receives the second reply signal along path $R_2$ as shown, for example, in FIG. 5. However, if the emission of a second interrogation signal is not desired, then the transponder 44, after a known delay, retransmits its first reply signal, with data indicating the delay period, to the receiver 14 along path $R_2$. The purpose of this time delay is to separate the paths $R_1$ from $R_2$ such that the vehicle mounted system 10 will have a third reference point, (the location that the receiver 14 receives the retransmitted reply signal), to use in its triangulation method. In this case, the other two reference points are the location of the vehicle upon receipt of the first reply signal and of the transponder 44.

Upon receipt of the desired reply and/or reflected signals, the system measures the time differences between transmission and reception of the respective signals. Then, the vehicle mounted system 10 determines the distances of the vehicle from the transponders 44 by determining the distances that the communication signals have traveled. The vehicle mounted system 10 also acquires other data necessary for determining the vehicle's position, such as, the positions and distances of the transponders 44 from the roadway 2, the distances between adjacent transponders 44, and the distance that the vehicle traveled between signal transmissions and/or signal receptions. Based on the positions and distances obtained, the vehicle mounted system 10 can use triangulation methods to determine the position of the vehicle 4 on the roadway 2.

FIGS. 10 and 11 are examples of vehicle and transponder data. The vehicle data is transmitted by transmitter 12 to a transponder 44 and the transponder data is transmitted from the transponder 44 to the receiver 14. The vehicle data shown in FIG. 10 includes the identification code, the vehicle license plate number, the vehicle speed and the vehicle code. The vehicle code can include data such as the vehicle model, the vehicle direction, the angles of the front tires and the location of the transmitter 12 and receiver 14 on the vehicle. The transponder data shown in FIG. 11 includes an identification code, the vehicle license plate or vehicle identification code, and the transponder code, which may include processing speed, delay periods or transponder unique location code.

Although the present invention has been described and illustrated in detail, it is clearly understood that the same is by way of illustration and example only and is not to be taken by way of limitation, the spirit and scope of the present invention being limited only by the terms of the appended claims.

We claim:

1. In a roadway system having transponders spaced along the roadway outside the intended track for traveling vehicles, each transponder transmitting a reply signal in response to a vehicle originated interrogation signal, a method of determining a vehicle's position along the roadway, comprising:

(a) transmitting the vehicle originated interrogation signal at an unknown angle at least partially transverse to the vehicle's direction of travel towards the transponders;

(b) receiving the reply signal in response to the vehicle originated interrogation signal, said reply signal identifying the position of the transponder;

(c) measuring a time difference between transmission of the vehicle originated interrogation signal and receipt of each corresponding reply signal;

(d) determining a distance between the vehicle and at least one of the responding transponders from the measured time differences; and (e) determining the position of the vehicle along the roadway using a selected triangulation method based on the distance between the vehicle and at least one responding transponder and on the position of the transponder as identified by its reply signal.

2. The method of claim 1, further comprising:
(f) transmitting another vehicle originated interrogation signal;
(g) receiving another reply signal in response to the another vehicle originated interrogation signal; and
(h) measuring the time difference between transmission of the another vehicle originated interrogation signal and receipt of the another reply signal.

3. The method of claim 1, wherein each vehicle originated interrogation signal includes a vehicle identification code uniquely identifying the vehicle.

4. The method of claim 1, wherein the vehicle originated interrogation signal is a spread spectrum signal having a pseudo-random noise code imbedded therein.

5. The method of claim 4, wherein the pseudo-random noise code is unique to the vehicle.

6. The method of claim 1, further comprising using a different triangulation methods as the vehicle varies its position along the roadway.

7. The method of claim 1, wherein the plurality of triangulation methods includes at least one of:
a first triangulation method determining the distance between the vehicle and one of the transponders at two time instants, the vehicle transmitting a vehicle originated interrogation signal at both of the two time instants,
a second triangulation method determining the distance between the vehicle and one of the transponder at two time instants, the vehicle transmitting a vehicle originated interrogation signal at only a first of the two time instants, and
a third triangulation method determining the distance between the vehicle and two of the transponders at one time instant, the vehicle transmitting a single vehicle originated interrogation signal at both the two transponders.

8. In a roadway system having transponders spaced at known positions along the roadway outside the intended track for traveling vehicles, each transponder transmitting a reply signal in response to a vehicle originated interrogation signal, a system for determining a vehicle's position along the roadway, comprising:
emission means for transmitting the vehicle originated interrogation signal at an unknown angle at least partially transverse to the vehicle's direction of travel towards the transponders;
reception means for receiving the at least one reply signal in response to the vehicle originated interrogation signal, said reply signal identifying the position of the transponder;
comparison means for measuring a time difference between transmission of the vehicle originated interrogation signal and receipt of each corresponding reply signal;
distance valuation means for determining the distance between the vehicle and at least one of the responding transponders from the measured time differences; and
position locating means for determining the position of the vehicle along the roadway using a selected triangulation method and the distances determined by the distance valuation means.

9. The system of claim 8, wherein the emission means transmits another vehicle originated interrogation signal, said reception means receiving another reply signal in response to the another vehicle originated interrogation signal, said comparison means measuring the time difference between transmission of the another vehicle originated interrogation signal and receipt of the another reply signal.

10. The system of claim 8, wherein each vehicle originated interrogation signal includes a vehicle identification code uniquely identifying the vehicle.

11. The system of claim 8, wherein the vehicle originated interrogation signal is a spread spectrum signal having a pseudo-random noise code imbedded therein.

12. The system of claim 10, wherein the pseudo-random noise code is unique to the vehicle.

13. The system of claim 8, wherein the position locating means uses a different triangulation method as the vehicle varies its position along the roadway.

14. The system of claim 8, wherein the plurality of triangulation methods include at least one of:
a first triangulation method determining the distance between the vehicle and one of the transponders at two time instants, the vehicle transmitting a vehicle originated interrogation signal at both of the two time instants,
a second triangulation method determining the distance between the vehicle and one of the transponder at two time instants, the vehicle transmitting a vehicle originated interrogation signal at only a first of the two time instants, and
a third triangulation method determining the distance between the vehicle and two of the transponders at one time instant, the vehicle transmitting a single vehicle originated interrogation signal to both the two transponders.

15. In a roadway system having transponders spaced at known positions along the roadway outside the intended track for traveling vehicles, each transponder transmitting a reply signal in response to a vehicle originated interrogation signal, a system for determining a vehicle's position along the roadway, comprising:
a vehicle mounted transmitter that transmits at least one vehicle originated interrogation signal at least partially transverse to the vehicle's direction of travel at an unknown angle toward the transponders;
a vehicle mounted receiver that receives the reply signal in response to the vehicle originated interrogation signal from the at least one transmitting transponder, said reply signal identifying the position of the transponder;
a comparator circuit that measures a time difference between transmission of each vehicle originated interrogation signal by the transmitter and receipt of each corresponding reply signal by the receiver; and
a distance measurement circuit that determines the distance between the vehicle and the at least one responding transponder and uses a selected triangulation method to determine the position of the vehicle on the roadway.

16. The system of claim 15, wherein the vehicle originated interrogation signal includes a vehicle ID code uniquely identifying the vehicle.

17. The system of claim 15, wherein the vehicle originated interrogation signal is a spread spectrum signal having a pseudo-random noise code imbedded therein.

18. The system of claim 17, wherein the pseudo-random noise code is different for each vehicle.

19. The system of claim 15, wherein the distance measurement circuit uses a different triangulation method of any vehicle position along the roadway.

20. The system of claim 15, wherein the plurality of triangulation methods includes at least one of:
- a first triangulation method determining the distance between the vehicle and one of the transponders at two time instants, the vehicle transmitting a vehicle originated interrogation signal at both of the two time instants,
- a second triangulation method determining the distance between the vehicle and one of the transponder at two time instants, the vehicle transmitting a vehicle originated interrogation signal at only a first of the two time instants, and
- a third triangulation method determining the distance between the vehicle and two of the transponders at one time instant, the vehicle transmitting a single vehicle originated interrogation signal at both the two transponders.

21. A system for determining a position of a vehicle along a roadway by communicating with a ground-side system having a data-station at a known position along the roadway outside the intended track for traveling vehicles, comprising:
- a transmitter that transmits an interrogating signal in a direction at least partially transverse to the vehicle's direction of travel to the data-station;
- a receiver that receives a reply signal from the data-station, said reply signal identifying the position of the transponder;
- a time measuring device that measures a delay time between transmission of the interrogating signal and receipt of the signal to determine a distance between the vehicle and the data-station; and
- a triangulation calculating device that determines the vehicle's position based on the distance between the vehicle and the data station at two time instants and on the position of the data-station as identified by its reply signal.

22. The system of claim 21, wherein the interrogating signal from the vehicle includes a vehicle identifying signal.

23. The system of claim 21, wherein the reply signal from the data-station has a delay time information corresponding to a delay time between a reception of the interrogating signal from the vehicle and a transmission of the replying signal to the vehicle.

24. The system of claim 21, wherein the time measuring device has a DLL locked to a same frequency standard as a DLL in the data-station.

25. A system for determining a position of a vehicle along a roadway by communicating with a ground-side system having data-stations spaced at known position along the roadway outside the intended track for traveling vehicles, comprising:
- a transmitter that transmits an interrogating signal in a direction at least partially transverse to the vehicle's direction of travel to two of the data-stations;
- a receiver that receives a reply signal from each of the two data-stations, said reply signals identifying the position of the transponder;
- a time measuring device that measures a delay time between the interrogating signal and the reply signal to determine a distance between the vehicle and the two data-stations; and
- a triangulation calculating device that determines the vehicle's position based on the positions of the two data-stations as identified by their reply signals and of the distance between the vehicle and the two data stations.

26. The system of claim 25, wherein the interrogating signal from the vehicle includes a vehicle identifying signal.

27. The system of claim 25, wherein the reply signal from the data-station has delay time information included therein corresponding to a delay time between a reception of the interrogating signal from the vehicle and a transmission of the replying signal to the vehicle.

28. The system of claim 25, wherein the time measuring device has a DLL locked to a same frequency standard as a DLL in the data-station.

* * * * *